United States Patent [19]

Laran

[11] Patent Number: 4,481,183
[45] Date of Patent: Nov. 6, 1984

[54] SYNTHESIS OF COMPLEX BERYLLIUM HYDRIDES

[75] Inventor: Roy J. Laran, Greenwell Springs, La.

[73] Assignee: Ethyl Corporation, Richmond, Va.

[21] Appl. No.: 566,193

[22] Filed: Dec. 28, 1983

[51] Int. Cl.³ .............................................. C01B 6/24
[52] U.S. Cl. .................................................... 423/644
[58] Field of Search ........................................ 423/644

[56] References Cited

U.S. PATENT DOCUMENTS 3,383,187 5/1968 Rice et al. .......................... 423/644
3,647,399 3/1972 Ashby et al. ........................ 423/644

Primary Examiner—Herbert T. Carter
Attorney, Agent, or Firm—Donald L. Johnson; John F. Sieberth

[57] ABSTRACT

Alkali metal beryllium tetrahydride is produced by subjecting a mixture of beryllium and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, to a pressurized atomsphere of hydrogen and an elevated temperature at which alkali metal beryllium tetrahydride of the formula $M_2BeH_4$ is produced.

27 Claims, No Drawings

SYNTHESIS OF COMPLEX BERYLLIUM HYDRIDES

This invention relates to a novel process for the synthesis of alkali metal beryllium tetrahydrides, such as dilithium beryllium tetrahydride, disodium beryllium tetrahydride, and the like.

U.S. Pat. No. 3,647,399 to Ashby and Kobetz describes the first successful synthesis of the alkali metal beryllium tetrahydrides. The process they employed involves the reaction of a beryllium dialkyl, $BeR_2$ (R=alkyl of 1 to 10 carbon atoms), with a compound of the formula $MAlR_3H$, $MAlR_2H_2$, or a mixture of both such compounds (M=alkali metal).

In accordance with this invention alkali metal beryllium tetrahydride is produced by subjecting a mixture of beryllium and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, to a pressurized atmosphere of hydrogen and an elevated temperature at which alkali metal beryllium tetrahydride of the formula $M_2BeH_4$ is produced.

The beryllium employed in the process is preferably in sub-divided form such as flakes, chips, turnings, ribbon, powder, or the like. It may be used in relatively pure form or in the form of alloys such as beryllium-titanium, beryllium-zirconium, beryllium-titanium-zirconium, or the like, provided the alloy contains a sufficient quantity of beryllium to enable the desired reaction to take place. Preferred alloys contain 90 weight percent or more of beryllium.

The alkali metal aluminum complexes useful in the process comprise the alkali metal aluminum hydrocarbyl trihydrides, $MAlRH_3$; the alkali metal aluminum dihydrocarbyl dihydrides, $MAlR_2H_2$; the alkali metal aluminum trihydrocarbyl hydrides, $MAlR_3H$; the alkali metal aluminum tetrahydrocarbyls, $MAlR_4$; and mixtures of any two or three or all four of these. The hydrocarbyl groups, R, may contain any suitable number of carbon atoms and may be aliphatic, cycloaliphatic, and/or aromatic. R may also be any suitably inert heterocyclic group, (groups in which the hetero atom(s) may be nitrogen, oxygen, etc.) or R may be any other inert substituted or unsubstituted cyclic or acyclic organic group which does not interfere with the desired reaction.

Exemplary hydrocarbyl compounds of this type include lithium aluminum ethyl trihydride, sodium aluminum butyl trihydride, potassium aluminum methyl trihydride, lithium aluminum phenyl trihydride, sodium aluminum cyclohexyl trihydride, sodium aluminum benzyl trihydride, potassium aluminum octadecyl trihydride, lithium aluminum phenethyl trihydride, lithium aluminum dimethyl dihydride, sodium aluminum dipentyl dihydride, potassium aluminum diethyl dihydride, sodium aluminum bis(p-tolyl) dihydride, sodium aluminum bis(cyclopentyl) dihydride, sodium aluminum dibenzyl dihydride, potassium aluminum bis(hexadecyl) dihydride, lithium aluminum bis(phenethyl) dihydride, lithium aluminum ethyl methyl dihydride, lithium aluminum trimethyl hydride, sodium aluminum tripropyl hydride, potassium aluminum triethyl hydride, sodium aluminum tris(p-ethylphenyl) hydride, sodium aluminum bis(cyclopentyl) ethyl hydride, sodium aluminum tribenzyl hydride, potassium aluminum tris(tetradecyl) hydride, lithium aluminum tris(cyclopropylcarbinyl) hydride, lithium aluminum tetraethyl, lithium aluminum tetrabutyl, sodium aluminum tetrabutyl, potassium aluminum tetramethyl, lithium aluminum tetraphenyl, sodium aluminum tetracyclohexyl, sodium aluminum dibenzyl dimethyl, potassium aluminum tetraoctadecyl, lithium aluminum phenethyl triethyl, and the like. Sodium aluminum tetraethyl and equivalent sodium aluminum tetraalkyls, as well as their lithium counterparts are the preferred reactants.

The relative proportions between the beryllium and the alkali metal aluminum complex are not critical. However since the amount of the desired alkali metal beryllium tetrahydride formed is normally limited by the amount of the alkali metal aluminum complex employed, it is preferred to use this reactant in excess. For best results it is preferred to employ at least two gram moles of the alkali metal aluminum complex per gram equivalent of beryllium used.

It is desirable and convenient to use an excess of hydrogen.

Hydrogen pressures of at least about 1,000 psig will normally be employed, although in some cases reaction may proceed at lower pressures. Preferably the atmosphere is composed essentially entirely of dry hydrogen, although mixtures of hydrogen and other suitable gaseous materials, such as nitrogen, argon, etc., may be used if desired. Temperatures in the range of about 100° to about 350° C., and preferably in the range of about 125° to about 275° C., may be used. On the basis of available information, there is nothing critical about these reaction conditions provided of course that in any given case the pressure and temperature conditions selected result in the formation of the desired alkali metal beryllium tetrahydride and do not cause its decomposition.

The reaction may be conducted in bulk (i.e., no diluent is introduced into the reaction system). However it is deemed preferable to carry out the reaction in a suitable innocuous liquid diluent such as a hydrocarbon. Alkanes, cycloalkanes and aromatics are desirable materials for this use.

Use of agitation to insure intimate contact among the reaction components is recommended.

The following Examples are illustrative of the process.

EXAMPLE I

A 250 mL magnetically stirred pressure reactor was charged, while in a dry box under an atmosphere of dry nitrogen, with 1.5 g of beryllium metal (ground to −325 mesh) containing 3760 ppm of titanium metal, 75 mL of toluene, and 18.4 g of sodium aluminum tetraethyl. The toluene had been distilled from sodium aluminum tetrahydride and stored under dry nitrogen prior to use. The reactor was sealed, removed from the dry box, pressurized with hydrogen and heated with agitation to 150° C. and 2,000 psig total pressure. Total reaction time was 18 hours. The reaction resulted in the formation of gray solids. X-ray analysis of this product showed it to contain disodium beryllium tetrahydride, $Na_2BeH_4$, and some beryllium metal. The product evolved 77.7 mmoles of hydrogen gas per gram.

EXAMPLE II

The procedure of Example I was repeated in the same fashion except that 1.75 g of the beryllium metal (same content of titanium), 100 mL of the toluene and 32.3 g of sodium aluminum tetraethyl were used, and the total pressure in the reactor was 3,800 psig. X-ray analysis of the gray solids formed in the reaction indicated they were composed mostly of disodium beryllium tetrahydride, $Na_2BeH_4$, and contained some beryllium metal. The product evolved 77.2 mmoles of hydrogen gas per gram.

The alkali metal beryllium tetrahydrides are useful as portable sources of hydrogen gas and as reducing agents in a variety of chemical synthesis reactions. Other known uses for the materials are referred to in U.S. Pat. No. 3,647,399 to Ashby and Kobetz, the disclosure of which is incorporated herein.

This invention is susceptible to considerable variation in its practice in accordance with the true spirit and scope of the ensuing claims.

What is claimed is:

1. A process which comprises subjecting a mixture of beryllium and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, to a pressurized atmosphere of hydrogen and an elevated temperature at which alkali metal beryllium tetrahydride of the formula $M_2BeH_4$ is produced.

2. The process of claim 1 wherein m is 4 and n is 0.
3. The process of claim 1 wherein M is lithium.
4. The process of claim 1 wherein M is sodium.
5. The process of claim 1 wherein m is 4, n is 0 and M is lithium.
6. The process of claim 1 wherein m is 4, n is 0 and M is sodium.
7. A process which comprises subjecting an agitated mixture of finely divided beryllium and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, to a pressurized atmosphere of hydrogen and an elevated temperature at which alkali metal beryllium tetrahydride of the formula $M_2BeH_4$ is produced.

8. The process of claim 7 conducted in an innocuous liquid reaction medium.
9. The process of claim 8 wherein m is 4 and n is 0.
10. The process of claim 8 wherein M is lithium.
11. The process of claim 8 wherein M is sodium.
12. The process of claim 8 wherein m is 4, n is 0 and M is lithium.
13. The process of claim 8 wherein m is 4, n is 0 and M is sodium.
14. A process which comprises subjecting an agitated mixture of finely divided beryllium and an alkali metal aluminum complex of the formula $$MAlR_4$$

wherein M is an alkali metal and R is a hydrocarbyl group, to a pressurized atmosphere of hydrogen and an elevated temperature at which alkali metal beryllium tetrahydride of the formula $M_2BeH_4$ is produced.

15. The process of claim 14 conducted in an innocuous liquid reaction medium.
16. The process of claim 15 wherein M is lithium.
17. The process of claim 15 wherein M is sodium.
18. The process of claim 15 wherein R is an alkyl group.
19. The process of claim 15 wherein the pressure is at least about 1,000 psig and the temperature is in the range of about 100° to about 350° C.
20. The process of claim 19 wherein R is an alkyl group, the liquid reaction medium is composed at least predominantly of an aromatic hydrocarbon, and for at least a predominant portion of the reaction (i) the pressure is at least about 2,000 psig and (ii) the temperature is in the range of about 125° to about 275° C.
21. The process of claim 14 wherein the finely divided beryllium is a beryllium-titanium alloy and the process is conducted in an innocuous liquid reaction medium.
22. A process which comprises subjecting a mixture of (i) a beryllium alloy containing at least 90% by weight of beryllium, said alloy being selected from the group consisting of beryllium-titanium, beryllium-zirconium, and beryllium-titanium-zirconium, and (ii) an alkali metal aluminum complex of the formula $$MAlR_mH_n$$

wherein M is an alkali metal, R is a hydrocarbyl group, m is an integer from 1 to 4 n is an integer from 0 to 3, the total of m and n being 4, to a pressurized atmosphere of hydrogen and an elevated temperature at which alkali metal beryllium tetrahydride of the formula $M_2BeH_4$ is produced.

23. The process of claim 22 wherein m is 4 and n is 0.
24. The process of claim 22 wherein M is lithium.
25. The process of claim 22 wherein M is sodium.
26. The process of claim 22 wherein m is 4, n is 0 and M is lithium.
27. The process of claim 22 wherein m is 4, n is 0 and M is sodium.

* * * * *